Oct. 29, 1963     J. A. SAFFIR     3,108,781
DENTAL ENGINE
Filed April 24, 1961
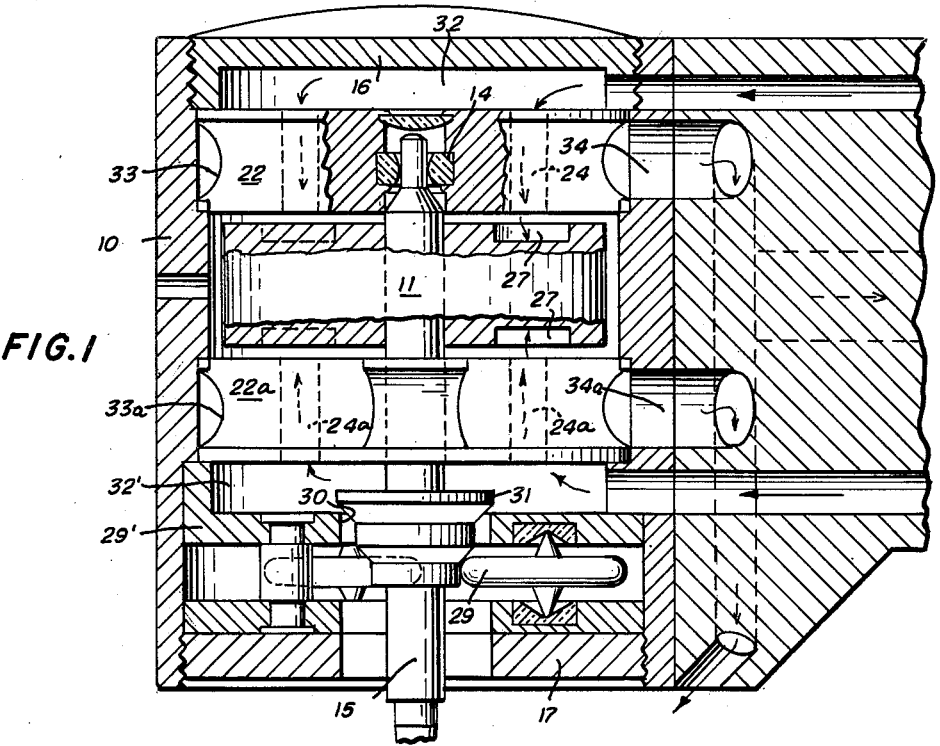
FIG. 1
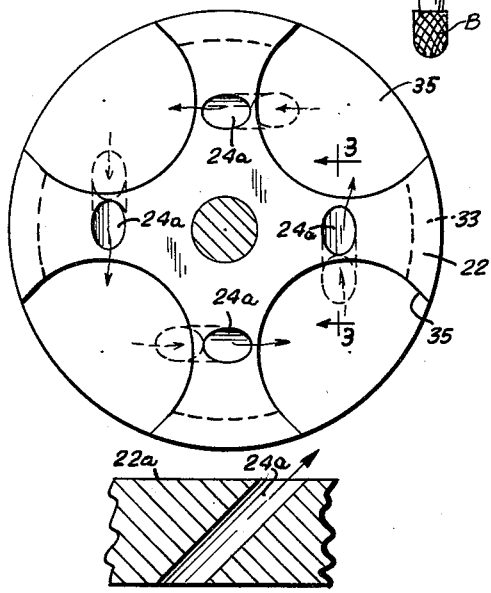
FIG. 2
FIG. 3
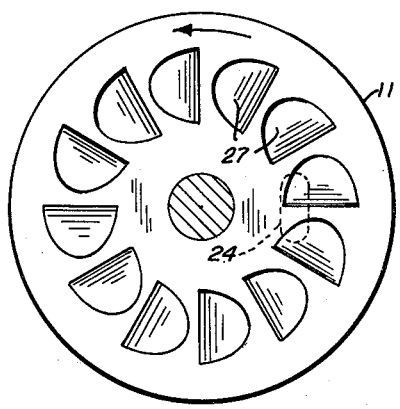
FIG. 4
INVENTOR
JACOB A. SAFFIR
BY Frederick W. Turnbull
ATTORNEY

United States Patent Office

3,108,781
Patented Oct. 29, 1963

3,108,781
DENTAL ENGINE
Jacob A. Saffir, 6530 W. 5th St., Los Angeles 48, Calif.
Filed Apr. 24, 1961, Ser. No. 105,065
3 Claims. (Cl. 253—3)

This invention relates to dental engines and more particularly to means to rotate cutting and grinding tools used by dentists and dental technicians.

It has been found to be desirable to rotate tools at a very high speed and, for this purpose, there have recently been developed both hydraulic and pneumatic turbines. As an example of the present invention a dentist's hand piece is used, and it is described as being a pneumatic device. It is to be understood, however, that the device may be made for uses other than in a hand piece. The problems that arise in hydraulic turbines are not as critical as in pneumatic turbines because of the incompressibility of the hydraulic materials. The use of air as the power source gives certain advantages over the use of water among which advantages are the higher speeds, and the fact that if too much force is exerted by the dentist the device will be more easily stopped, which is a desirable safety feature.

Turbines for these services have been made that use minute ball bearings that support both the radial and the axial thrusts developed in using the machine. Such machines are plagued with frequent bearing failures making it necessary for the dentist or technician to have duplicate equipment on hand at all times.

In turbine design for conventional uses it has been found that in turbines where the steam, for instance, impinges on the end surfaces of the rotor for developing power while flowing radially outwardly, it is especially difficult to avoid axial movement of the rotor since the necessary expansion from centrally located nozzles to the periphery of the turbine rotor must be $\pi$ times the radial distance, or in a turbine such as disclosed in the Docke et al. Patent 784,989 where the expansion is from nozzles peripherally located near the periphery of the rotor and the radial flow is toward the center, the expansion must be done in a path varying inversely with $\pi$ times the radial distance.

The known dental engines of the turbine type are of the peripheral bucket type and, due to the excessively high rotational speeds, and due to the end thrust on the turbine rotor in use, the bearings, whether ball bearings or jeweled bearings, are subject to excessive wear.

It is an object of the present invention to provide a dental machine in which the load on the bearings is minimized so that the causes of bearing failure will be substantially eliminated.

It is a further object of the present invention to provide a dental turbine in which axial movement of the rotor in use is resisted by fluid pressure of the fluid used to rotate the turbine.

It is a still further object of the invention to provide a turbine of the type described having its nozzles and buckets at the ends of the rotor and so constructed and arranged that the flow of fluid against the ends of the rotor does not tend to draw the rotor toward that end of the turbine housing.

Other and further objects and advantages will appear from the attached specification taken with the accompanying drawings in which like characters of reference refer to similar parts in the several views and in which:

FIGURE 1 is a sectional view of the device showing the invention;

FIGURE 2 is a plan view of element 22a of FIGURE 1;

FIGURE 3 is a fragmentary section of element 22a taken on line 3—3 of FIGURE 2;

FIGURE 4 is an end view of the rotor 11a of FIGURE 1.

In FIGURE 1 a construction is shown providing direct impulse turbine action. FIGURE 1 shows a turbine casing 10, end closures 16 and 17, an end plate 22 carrying a bearing 14 that supports the shaft 15 against radial movement but allows some axial movement, an apertured end plate 22a with an appropriate bearing, and a turbine rotor 11 on shaft 15.

The rotor 11 is provided on each end surface with a plurality of buckets 27 as seen in FIGURE 4. Air from nozzle 24 impinges on the curved side of buckets 27 as indicated by the dotted line showing in FIGURE 4 of the location of one of the nozzles 24. It is at once apparent that there will be an equal pressure on each end face of rotor 11 under normal operating conditions when the pressures in space 32 and 32' are the same.

Bearing 29 may be of any known design but must provide means to stop axial movement of the shaft, and therefore the rotor, toward the burr B.

Shaft 15 passes through a central opening 30 in the bearing plate 29' and end closure 17. A flange 31 is provided on the shaft that has a variable clearance between it and the edge of opening 30. If end thrust on the burr B tends to move the rotor 11 upwardly, the flange 31 will move upwardly which will enlarge the clearance between flange 31 and the edge of opening 30 so there will be less pressure against the lower side of rotor 11 so there will be a biasing of the rotor toward the burr B if the rotor is moved. Since the entire device is minute a very small axial movement of the shaft and rotor will make a comparatively great difference in the back pressure.

The space between the end plate 22a and the bearing plate 29', or end closure through which the shaft passes, is a high pressure chamber 32'. Movement of flange 31 on shaft 15 away from the edge of opening 30 will, then, reduce the pressure to the turbine at this end, and since there will be no reduction of pressure at the other end, the rotor will be biased by air pressure toward burr B if the burr moves the shaft 15, upwardly in FIGURE 1.

The end plates 22 and 22a of FIGURE 1 are mirror images of each other, except for the presence of bearing 14 in end plate 22, so that the nozzles 24 and 24a extend through the entire thickness of the end plate from high pressure chamber 32 or 32' to a point adjacent the inner side of buckets 27. Nozzles 24a are slanted so that in a section they have exactly the same appearance as nozzles 24 in FIGURE 3 but nozzles 24 and 24a slope toward the rotor 11 to drive the rotor in the anticlockwise direction in FIGURE 4.

Nozzles 24 and 24a are generally tangential to the rotor 11a and to the curve of buckets 27 so that the impulse of the air from nozzles 24 rotates the rotor and the air flowing around the curve of buckets 27 exhausts at the periphery of the turbine rotor from where it can flow freely to exhaust ports 33 which are formed as annular grooves around the end plates 22 and 22a via cut away portions 35 that constitute exhaust recesses on the side of the end plate toward the rotor thence to openings 34 in the turbine casing 10a.

It will be seen, then, that the operation of the turbine of FIGURE 1 will not result in a venturi action between the rotor and the end plate tending to pull the rotor toward the adjacent casing end. The desired back pressure on the turbine can be provided by restricting exhaust passage 34.

Some form of bearings that limit axial movement of the shaft should be provided to prevent excessive axial movement of the rotor, as it would clearly not be desirable for the rotor to contact the end plates of the casing. The present application, however, is not concerned with the specific bearings selected.

It will be seen, therefore, that a turbine has been provided in which end thrusts are carried principally by pressure of the air that provides the motive power. Radial thrusts only being normally supported by the bearings.

It will be understood that in view of the specific structure described above other modifications of the device can be made without departing from the scope of the following claims.

I claim:

1. In a dental turbine, a housing provided with opposed ends, a bearing in each said opposed end, a shaft mounted for free rotary and limited axial movement in said bearings, a turbine rotor fixed to said shaft between said two bearings and having ends in juxtaposition to said opposed ends of said housing, a fluid pressure chamber in each of said opposed ends of said housing, turbine buckets on each end of said turbine rotor, nozzle means in each said opposed end arranged to direct a fluid under pressure against said buckets, whereby said rotor is rotated, one end of said shaft extending through its bearing and adapted to support a cutting tool, a fluid passage surrounding said one end of said shaft, and valve means mounted on said shaft adapted to open said fluid pressure chamber upon axial movement of said shaft under the influence of an axial load on said cutting tool to cause a drop in fluid pressure in said chamber whereby said rotor is biased axially by the fluid pressure chamber at the other end of the housing.

2. A dental turbine including a generally cylindrical housing having opposed housing ends, a generally cylindrical rotor mounted for rotating in, and for limited axial movement coaxially of said housing, a single row of buckets formed in each end of said rotor, nozzle means in the housing ends opposite each end of said rotor to impinge on said buckets, passage means leading from a supply of fluid under pressure to said nozzles, exhaust passages leading from said buckets to an opening in said housing, a pressure venting opening coaxial of said rotor, shaft means on said rotor extending through said pressure venting opening and valve means mounted coaxially on said shaft for cooperating with said pressure venting opening, said valve operating with said opening to adjust the pressure at the ends of the rotor upon axial movement of said rotor.

3. A dental turbine including a generally cylindrical housing, an end wall including inner and outer wall elements for each end of said housing, a bearing in each end wall coaxially of said housing, a shaft carried by said bearings extending between said bearings and coaxially through said housing, said bearings permitting limited axial movement of said shaft, at least one end of said shaft extending beyond one said end wall to carry a cutting tool, a coaxial opening in the outer element of said end wall surrounding said one end of said shaft, a rotor mounted on said shaft within said housing, fluid pressure turbine nozzles carried by the inner element of each said end wall and turbine buckets carried by said rotor opposite said nozzles, a supply of fluid under pressure, and means delivering fluid under pressure between the inner and outer end wall elements and valve means operated by axial movement of said shaft and rotor in one direction whereby the pressure of fluid at the end of the rotor is varied to resist the axial movement.

References Cited in the file of this patent

UNITED STATES PATENTS

| | | |
|---|---|---|
| 445,593 | Austin | Feb. 3, 1891 |
| 642,949 | Baillie et al. | Feb. 6, 1900 |
| 782,222 | Cuthbert | Feb. 14, 1905 |
| 807,452 | Franke | Dec. 19, 1905 |
| 839,999 | Kellogg | Jan. 1, 1907 |
| 921,238 | Groshon | May 11, 1909 |
| 1,098,319 | Dake | May 26, 1914 |
| 2,763,461 | Hill | Sept. 18, 1956 |
| 2,808,225 | Johnson | Oct. 1, 1957 |
| 2,891,312 | Ellis | June 23, 1959 |

FOREIGN PATENTS

| | | |
|---|---|---|
| 187,678 | Great Britain | Oct. 19, 1922 |
| 250,207 | Great Britain | Feb. 3, 1927 |